3,222,210
POLYOLEFIN PACKAGING FILM
John E. Hammond, Rochester, N.Y., assignor to National Distillers and Chemical Corporation, New York, N.Y., a corporation of Virginia
No Drawing. Filed Aug. 3, 1962, Ser. No. 214,501
10 Claims. (Cl. 117—68)

The present invention relates generally to improved thermoplastic sheeting and films and specifically to new anti-clinging, anti-fogging polyolefin wrapping materials which are especially adapted to wrapping moisture-containing and moisture-emitting products such as fresh meats, poultry, fresh vegetables, and the like, and particularly for wrapping products which are subjected to refrigeration while so packaged. It is especially adapted for making such packaging materials from thermoplastic polymers of ethylene or propylene, and from copolymers thereof, and from copolymers of ethylene and of propylene with other polymerizable monomers.

It is an object of this invention to provide a method for making clear, transparent, anti-clinging, anti-fogging packaging materials using thermoplastic polyolefin sheeting and/or film.

It is a further object of the invention to provide an improved transparent sheet or film having resistance to cling.

A still further object of the invention is to provide an improved transparent wrapping material for packaging moisture-containing food products in which the wrapping material is resistant to cling and to fogging which is caused by moisture condensation thereon when the wrapped products are subjected to temperature changes.

Another object is to provide an anti-cling wrapping material for moisture-containing products for which a polyolefin sheet or film is the base material or substrate.

It is a further object of this invention to provide an improved, transparent, flexible wrapping material which is resistant to cling and to fogging when used to encase moisture-containing food products, normally subjected to refrigeration.

Other objects and advantages of the invention will become apparent from the detailed description presented hereinbelow.

It has become wide-spread commercial practice in the merchandising of freshly cut meats and other produce to wrap individual items in films of transparent plastic material. The thus-wrapped products are visible through the packaging material and can be displayed, for example, in a refrigerated counter.

The characteristics of the wrapping material are very important for this type of application. The package should be attractive, and the inner surface of the plastic wrapping material must be resistant to fogging under conditions of refrigeration and during changes of temperature. Furthermore, the meat, poultry, or other product encased in such a package must remain fresh and retain its color during wrapping, display, and storage. For example, when used to encase freshly cut red meats, the package wrapping should transmit oxygen at a rate sufficient to retain the red color or co-called "bloom" of the meat. The film also should be capable of being readily and tightly sealed, preferably by heat, to substantially prevent leakage of moisture and juices contained in the completed package, and it should be easily dispensed, for example, from packs of film sheets.

The wrapping film material should be relatively impervious to moisture in order to prevent loss of moisture from the encased product. The wrapping film also must remain flexible and tough and must not tear or crack during its use or become brittle.

Since many polyolefin plastic films inherently possess certain desired properties, including high permeability to oxygen, low water permeability, and excellent low temperature sealability, transparent polyolefin film or sheeting offers a good material for use as a substrate or base in such packaging.

Because of other inherent properties of polyolefin films, however, principally the hydrophobic characteristics of the film surface, after moisture-containing products are encased therein, water of condensation rapidly collects and remains on the inner surface of the film as droplets which result in fogging of the film and serious impairment of the transparency. In particular, it has been noticed that such condensation occurs more noticeably when the wrapped, moisture-containing products are subjected to temperature changes such as refrigeration after having been packaged. Subsequently, cycles of temperature changes will also produce the fogging effect in a more pronounced and erratic fashion.

In order to produce an anti-fogging polyolefin wrapping material having the above-described improved characteristics, there is applied to the polyolefin sheeting or film a composition made up of at least one selected wetting agent, at least one selected water-soluble film-forming polymeric material, and at least one selected water-soluble inorganic material.

Polyolefin films and sheets useful as transparent packaging materials, and especially those polyolefin films and sheets that have been treated to improve their resistance to fogging, often exhibit objectionable clinginess or stickiness, especially when the film is dispensed from packs of film sheets rather than from rolls of films. The film tends to adhere to itself when two or more surfaces of the film are pressed together, such as, for example, when sheets of the film are stacked in storage. It is especially pronounced at elevated temperatures and high relative humidities. Under normal storage conditions, the maximum temperatures encountered will be between about 100° and 110° F. It is desirable that under these temperature conditions the sheeting or film will not stick to itself. Otherwise, when the film is stored in cut sheet packages or in rolled form on cores, for example, the layers will stick or cling together and the sheets or layers of film cannot readily be separated for use. This "cling" can be eliminated, without deleteriously effecting the other properties that make the film particularly useful for packaging foodstuffs, flowers, and the like, by the application to at least one side of the film of a composition comprising an aqueous solution of at least one alkali-soluble resin dissolved with a volatile base, an inert finely-divided diluent and at least one polymer latex that is infusible at subsequent drying temperatures.

When an anti-fog coating is applied to one side of the substrate, the anti-cling coating can be applied to the other side. While a substrate coated on one side with an anti-fog coating composition and on the other side with an anti-cling coating composition, to be described in detail hereinafter, is the preferred embodiment of this invention, it is possible also to coat both sides of the film or sheet with an anti-cling coating; to coat one side of the substrate with an anti-cling coating and the other side with another material, such as for example a structure with which lamination may be desired; or to coat one side of the substrate with an anti-cling coating and to leave the other side uncoated.

Although the practice of this invention will be illustrated with use of a polyethylene film, the invention is not intended to be limited thereto. It is especially preferred in carrying out the invention to use as the polyolefin substrate or base a polyethylene or polypropylene film prepared in such a way as to have the combination of desired properties of high clarity, toughness, and high impact strength. For example, it is possible to produce cast film to give a highly transparent, glossy polyolefin film for use as the base. It is also possible to employ as the base film material copolymers of ethylene and propylene, either each other or with at least one other polymerizable monomer such as, for example, those alpha-olefins having from 2 to 8 carbon atoms such as 1-butene, 1-pentene, 1-hexene, 1-octene, and mixed higher alpha-olefins. Other hydrocarbons useful for making copolymers with ethylene and propylene include divinylbenzene, allene, dimethallyl, and isopentene. Comonomers which can broadly be used include monosubstituted ethylenes such as 1-pentene, vinylcyclohexene, allyl benzene, $C_8$–$C_{14}$ mixed alpha-olefins, styrene, allyl naphthalene, and the like; 1,1-disubstituted ethylenes such as alpha-methyl styrene, 2-methylbutene-1, mixed alpha- and beta-pinenes, camphene, and the like; 1,2-disubstituted ethylenes such as indene, acenaphthylene, cyclopentene, norbornylene, cyclohexene, trans-stilbene, 2-pentene, and the like; conjugated dienes and trienes such as pentadiene-1,3, 1,2-dihydrobenzene, alloocimene, and cyclopentadiene; unconjugated dienes such as mixed octadienes, hexadiene-1,5, 2,5-dimethylhexadiene-1,5 1,4-dihydrobenzene, bicycloheptadiene, bicyclopentadiene, 4-vinylcyclohexene-1, and 4-7-diphenyldecadiene-1,9; acetylenes such as isopropenyl acetylene and phenyl acetylene; chloroolefins such as beta-methallyl chloride, chloromethyl nobornylene, and m-chlorostyrene; ethers; epoxides; esters such as vinyl butyrate, vinyl acetate, and methyl acrylate; and nitrogen compounds such as vinyl carbazole, 4-vinyl pyridene, and acrylonitrile. Blends of such polymers and copolymers can also be employed to make the substrate resins.

The polyolefin sheeting or film material which is selected to act as the base for the herein-disclosed coated packaging and wrapping material can be, for example, from about 0.25 up to 5 mils in thickness, and the preferred film thickness is from about 0.5 to 1.5 mils. It is to be understood that films and sheeting materials of either lesser or greater thickness can also be employed in the practice of this invention, depending on the end use intended for the coated product.

The physical properties of the film employed should include relatively high transparency, high permeability to oxygen, low moisture permeability, and relatively low temperature heat sealability to form seals which are leak-proof to liquids. In addition, the films should generally be as uniform as possible both in the longitudinal and transverse directions and the tendencies to split should be minimized as much as possible.

In one embodiment, the film is coated on one side with an anti-cling composition made up of a selected alkali-soluble resin, a selected inert finely-divided diluent or filler, and a selected fusible polymer latex in an aqueous base solution and on the other side, that is, the side in contact with the material being packaged, an anti-fog composition made up of a selected water-soluble polymer together with a selected solid, water-soluble inorganic material, such as an inorganic salt.

Although other materials may be added to the above-defined coating compositions in order to realize special advantages, it has been found essential in this embodiment to include at least one representative of each of the above classes of components in each of the coating compositions used in accordance with this specific embodiment of the invention.

As disclosed hereinbefore, the anti-cling coating is composed of three solid components in an aqueous base solution. The first essential component, that is the alkali-soluble resin, can be a natural or a synthetic resin, with specific examples including shellac, Manila Loba gum, gum accroides, rosin-maleic acid or rosin-fumaric acid adducts alone or modified with polyhydric alcohols, zein, polyvinyl acetate-crotonic acid copolymers, polyacrylic ester acid copolymers, and the like, and mixtures thereof. These compounds are ordinarily very soluble in alcohol and are characterized by acid numbers between about 100 and 250. These resins are easily soluble in water with the assistance of a smal amount of alkali, such as ammonia, morpholine, an ethanolamine, and the like, or mixtures thereof. The deposited resinous film becomes water-insoluble upon drying, thus rendering the coating relatively resistant to moisture. In addition, these resins exhibit marked adhesion to polyolefins, especially as very thin coatings, whereby the natural stiffness of the resins is reduced to a minimum. Although, as indicated above, any of a number of natural or synthetic resins can be used, shellac is preferred because of its pronounced adherence to polyolefins, its flexibility, its ready availability, and its ease of incorporation into coating formulations such as the one described herein.

The second essential component of the anti-cling composition is an inert finely-divided diluent, such as bentonite, talc, starches, other clays, diatomaceous earth, silica, and the like. Aqueous dispersed colloidal silica is preferred, because of its particle size which is uniformly smaller (about 15 mu) than that of dry micro-silicas. Examples of aqueous dispersed colloidal silica include the commercial products Syton, Ludox, and Nalcoag. The inert diluent reduces the tendency of the alkali-soluble resin to "block" under heat and pressure. In addition it increases gas permeability of the coating; for example, if equal parts of shellac and silica were used, the permeability of a coated polyethylene substrate would remain substantially the same as that of the original uncoated polyethylene, whereas the application of the coating resin alone markedly reduces the permeability of the coated substrate.

Although a coating of the alkali-soluble resin and the inert diluent alone is capable of reducing the stickiness of a film surface, the film surface will be very smooth, resulting in limp sheets of film with little slip between them. Slipperiness is imparted to such surfaces by making them uneven in a micro sense, thus reducing the area of surface contact. Synthetic polymer latexes having a particle size of less than 0.1 up to 3 microns are suitable for this purpose. The selected latex should have a refractive index similar to that of the alkali-soluble resins and polyolefins, i.e., between about 1.4 and 1.7, in order to provide optical homogeneity of the coated film. The latex particles should be sufficiently hard to resist pressure and moderate temperature deformation, and they should soften near the temperature used for heat sealing the coated film so that they will not interfere with the seal. Furthermore, the latex particles should not be film-forming unless fused, since coalescence when drying would destroy their particulate nature. Such materials as unplasticized polyvinyl chloride latex; emulsions of unoxidized polyethylene; polystyrene, polyacrylate, and methacrylate latexes; styrene-butadiene copolymers; and the like, or mixtures thereof are suitable for this purpose.

It is to be understood that this is only one embodiment of the anti-cling coating composition and that the process of this invention is equally applicable to any other suitable anti-cling material and systems having one or more components.

Depending upon the method of application, the concentrations of the components of the anti-cling coating can vary over a wide range. Although the proportions of the individual components of the anti-cling composition in the total coating are not unduly critical, the ratio of the constituents to each other is important. The inert diluent solids must be present in an amount between about 20 and 150 phr. (parts per hundred of resin), since a lesser amount will not produce sufficient gas permeability in the coating and will have little effect on its surface hardness and a greater amount will produce excessive haziness and decrease the ability to heat seal effectively. The fusible resin latex solids should be present in an amount between about 1 and 60 phr., depending upon the particle size and chemical nature of the polymer. Lower ratios will not provide enough particles to reduce film surface area contact effectively, and higher ratios will make "sliding" heat seals difficult to obtain. The base should be present in an amount sufficient to dissolve the alkali-soluble resin completely and to maintain the solution pH above 7.0.

The anti-cling coating can be applied in any convenient manner, such as by brush, spray, roller coating, gravure, and the like, to produce a uniformly distributed coating on one or both sides of the substrate film. The excess coating solution can be removed by squeeze rolls, doctor knives, or the like. The anti-cling composition should be applied in such an amount that there will be deposited upon drying a layer between about 0.00002 and 0.0005 gram per square inch, the preferred weight being about 0.0001 gram per square inch.

The basic and most essential component of the anti-fog coating composition which may be applied to the base polyolefin film or sheeting is a water-soluble highly substituted cellulose ether, having for example at least one and preferably two or more ether linkages per anhydroglucose unit and at least one free hydroxyl group per anhydroglucose unit. The substituting groups can be methyl, ethyl, propyl, hydroxypropyl, or any combination of these. It is essential that the cellulose ether employed be substantially water-soluble under the conditions of use, thus limiting to some extent the size of the substituting groups that may be present. For instance, any substitution of solubilizing groups on the substituting group itself is desirable, such as hydroxyethyl and hydroxypropyl groups, carboxymethyl groups, and the like.

As another highly desirable component of the anti-fog coating composition there should be present limited and controlled amounts of a water-soluble inorganic salt in order to increase the speed of the anti-fog action. It has been found that the inorganic material is needed to clear the fog quickly after it has formed on the film; possibly to prevent the initial formation of the fog; and also to aid in prolonging the anti-fog properties of the film. Typical water-soluble inorganic compounds that have been found to operate satisfactorily include sodium chloride, sodium carbonate, sodium bicarbonate, sodium silicate, sodium ortho and pyro phosphates, sodium nitrate, sodium nitrite, and sodium sulfate. Corresponding salts of potassium and other alkali metals, including ammonium salts, can also be used with good results. In general, however, sodium salts are preferred for food packaging. Any water-soluble salt can be used, if desired, provided that its presence in effective amounts does not interfere with the solubility of the cellulose ether component.

While the ratio of the components present in this aqueous anti-fog coating composition is not unduly critical, it has been discovered that a weight ratio of from 1 part of salt to 1 part of cellulose ether up to about 8 to 1 is quite adequate.

In another embodiment, the anti-fog coating composition is a three-component one. Here the basic and most essential component is a water-soluble surface active or wetting agent. For food products, this wetting agent is preferably anionic, although a mixture of nonionic material plus a portion of anionic material may be used satisfactorily. Nonionic agents alone can be used, but when the wetting agent is solely nonionic, the film being coated may require additional treatment in order to get good application and/or adherence of the coating to the film surface.

Anionic types of surface active agents include alkali metal salts or compounds containing hydrophilic groups, such as sulfonated paraffinic hydrocarbons, sulfonated aromatic hydrocarbons, sulfonated alkyl aromatic hydrocarbons, sulfonated natural fatty materials, sulfonated fatty alcohols, sulfonated fatty acid esters, fatty acid amides, amino acids; alkali metal salts of sulfuric acid esters of fatty alcohols; alkali metal salts of phosphoric acid esters of fatty alcohols; and alkali metal salts of products obtained by saponification of fats. Examples of suitable anionic agents include sodium oleate, sodium stearate, potassium oleate, potassium lauryl sulfate, and many other compounds, such as, for example, the commerical products "Nacconol NRSF" (sodium dodecylbenzene sulfonate), "Igepon T–77" (sodium N-methyl-N-oleoyl taurate), "Sipon (sodium lauryl sulfate), "Maypon 4–C" (protein condensation product with oleoyl chloride), "Aquarex D" (sodium alkyl sulfate), "Aresklene" (dibutyl phenylphenol sodium disulfonate), "Avitex AD" (fatty alcohol sulfate), "Duponol" (Du Pont's fatty alcohol sulfates), "Tergitol" (sodium salt of alkyl sulfate), "Sarkosyl" (N-acyl sarcosines), "Sarkosyl NL–97" (sodium N-lauroyl sarcosinate), and the like.

Nonionic types of wetting agents can be condensation products of fatty materials and their derivates with ethylene oxide, condensation products of phenolic compounds having side chains with ethylene oxide, and condensation products of sorbitan and sorbitan esters with ethylene oxide. Suitable nonionic agents include polyethylene glycol fatty acid esters, such as the distearate; "Tweens" (polyoxyalkylene sorbitan fatty acid esters); and "Spans" (long-chain fatty acid partial esters of hexitol anhydrides).

In addition to the wetting agent a second component must be included in this anti-fog coating composition. This component is a water-soluble film-forming polymeric material, such as water-soluble resins, synthetic or natural gums, casein, pectins, algins, glues, gelatin, water-soluble starch derivatives, polyoxyethylenes, polyacrylic acids, and the like, or mixtures of these. Specific examples include carboxymethyl cellulose, carboxyethyl cellulose, hydroxymethyl cellulose, methylhydroxypropyl cellulose, polyvinyl pyrrolidene and its copolymers, propylene glycol alginate, polyvinyl alcohol, polyoxyethylene, and polycarboxymethylene. Such a film-forming material acts as a binder for the wetting agent and maintains it in the form of a thin coating which has sufficient adhesion to withstand normal handling. It also gives viscosity to the coating when re-wet and prolongs the anti-fog property of the wetting agent.

As the third necessary component of the anti-fog coating composition there must be present limited amounts, controlled to at least 10% of active wetting agent, of a water-soluble inorganic salt in order to increase the speed of the anti-fog action by facilitating rapid solution of the wetting agent in the water of condensation which collects on the film, as discussed hereinbefore. Typical water-soluble inorganic compounds which have been found to operate satisfactorily when used in conjunction with the wetting agents include sodium chloride, sodium carbonate, sodium bicarbonate, sodium silicate, sodium ortho and pyro phosphates, sodium nitrate, sodium nitrite, and sodium sulfate. Corresponding salts of potassium and other alkali metals, including ammonium salts, may also be used with good results. For example, 2.0 parts by weight of tetrasodium pyrophosphate per 1.5 parts by weight of wetting agent is effective.

While the ratio of the components present in the aqueous anti-fog coating composition is not unduly critical, it has been discovered that a weight ratio of about 0.25 to 1.0 part by weight of water-soluble film-forming polymeric material to from about 1 to 8 parts of inorganic salt to 1 part of wetting agent is quite adequate. In some cases, where the film-forming material gives low viscosity solutions, up to 10% of the material can be used in the coating composition.

It is to be understood that these are only two embodiments of the anti-fog coating composition and that the process of the invention is equally applicable to any other suitable anti-fog material and systems having one or more components.

The anti-fog coating to be put onto the film, said coating containing the ingredients described above, is substantially 100 percent water-soluble. The anti-fog coating thickness on the film can be in the approximate range of about 0.02 micron to 0.4 micron, and preferably is between about 0.05 micron and 0.1 micron. The actual amount of coating used on the film is about 0.0001 gram per square inch. In application of the coating on the film, the amount by weight can vary from about 0.00002 gram per square inch to 0.0005 gram per square inch, although the amount of each material required for producing maximum anti-fog properties while retaining transparency of the base film varies, depending upon the exact base film and the coating components selected.

To achieve the best results, the coating of the base film by the anti-fog coating composition is done from an aqueous dispersion or solution containing the wetting agent, the film-forming ingredients, and the inorganic salt.

The anti-fog dispersion or solution, preferably in aqueous form, is applied to the polyolefin structure or surface in any convenient and known manner, such as dipping, spraying, brushing, roll coating, gravure, and the like, preferably at a temperature of about 60° to 120° F. The excess aqueous coating solution can be removed by squeeze rolls, doctor knives, or the like. The coating composition should be applied in such an amount that there will be deposited upon drying a smooth, evenly distributed layer about 0.00002 to about 0.0005 gram per square inch, about 0.0001 gram per square inch being preferred. The thickness of the applied coating should be capable of dispersing moisture condensed thereon into a thin, relatively transparent film, spread evenly over the surface of the coated polyolefin film.

When using both anti-cling and anti-fog coatings, the order in which they are applied is not unduly critical.

The coatings on the polyolefin base are subsequently dried by hot air, radiant heat, or other convenient means. Upon drying, there is obtained a coated polyolefin film which has good permeability, high strength, good handling characteristics, good optical properties; which is resistant to clinging or stickiness and to fogging by droplets of moisture condensed thereon; and which is adapted for use, for instance, as a wrapping material or film for moisture-containing food products.

It must be understood that, in the selection of the individual components and the concentrations of each to be included in both the anti-cling coating and the anti-fog coating, the components must not interact or otherwise effect each other in any way to reduce the efficacy of each component as it functions in each mixture, except where synergistic effects may be realized. It must further be understood that for all items of food packaging it is imperative that all of the components contained in the coating compositions be non-toxic and substantially odorless.

The products contemplated as being especially suited and well-adapted for packaging and for the packaging of which the sheeting and film material of this invention is particularly suited include moisture-containing and moisture-emitting products such as fresh meat, poultry, food produce such as fresh fruits and vegetables, bakery products, dairy products, fish, sea foods, fresh flowers, and the like.

It is contemplated in the broad aspects of this invention that the coating compositions for the polyolefin films and sheeting materials and the process of applying such coating compositions to polyolefin surfaces, including but without limitation thereto film, sheeting material, and the like, are novel. It is also contemplated that the coated polyolefin structures are themselves novel as well as the sealed packages, structures, and containers formed therefrom, either with or without the encasement of the products therein.

Although the present invention will be illustrated by use of polyethylene film as the substrate, it is not intended to be limited thereto, the invention being equally applicable to polymers of ethylene and of propylene and to copolymers of ethylene and propylene, either with each other or with at least one other polymerizable co-monomer.

While there are disclosed below but a limited number of embodiments of the invention herein presented, it is possible to produce still other embodiments without departing from the inventive concept herein disclosed, and it is desired therefore that only such limitations be imposed on the appended claims as are stated therein.

In the following examples the anti-cling coating composition was prepared by slurrying the alkali-soluble resin in a major portion of water, warming to 120–150° F., and adding sufficient base to adjust the pH of the solution to about 9.0. The resin solution, inert diluent, and fusible polymer dispersion were combined with moderate agitation and no additional heat.

The coatings were applied from a smooth roll coater-smoothing roll assembly, followed by radiant heat drying. The polyethylene film temperature was maintained below about 150° F. to prevent distortion of the low density resin film selected, but the temperature could be modified to suit other coating equipment and other resin substrates. The coating speed was 5 feet per minute. In each case a coating weight about 0.0001 gram per square inch was applied.

In each case gloss was measured in accordance with ASTM Test Method D523–53T, haze by ASTM Method D1003–52, and block by ASTM Test Method D884–48. Oxygen permeability was measured by the isotactic method described by D. W. Davis in "Paper Trade J.," v. 123, No. 9:33–40 (1946).

To measure heat seal the test surfaces of a sample film were placed together, and the two films were placed on an Armalon slide. A 1" x 4" x 1¼" Armalon-covered aluminum block was placed on the top of the two films. The slide was pulled across a heated (480° F.) plate at a constant rate which allowed a 1-second dwell. The strength of seal was determined by manually pulling apart the sealed films and observing distortion and strength.

To determine wet seal retention a bag of the film to be tested was made with a 1" x 3" peelable bottom seal. A colored detergent solution was put into the bag, and the time required for the detergent to leak through the peelable seal was measured.

*Example I*

An anti-cling coating mixture containing shellac (10 percent solids) as the alkali-soluble resin, "Syton 200" (10 percent solids) as the inert diluent, "Geon 151" (0.5 percent solids) as the polymer particles, and 89.5 percent of water containing the necessary amount of ammonia for solution was prepared and applied to one side of a polyethylene film substrate. The resulting coated film, compared with an uncoated polyethylene film, had substantially unreduced gloss, minimal increase in haze, and unreduced gas permeability. The coated film was arranged and stored at about 100° F. as packs of film sheets, from which single sheets were easily dispensed. The coated film was then formed into a package which was easily heat sealed and which heat seals had good resistance to wet deterioration.

*Example II*

The procedure of Example I was repeated, except that the coating composition contained Manila Loba C gum instead of shellac. The results were comparable.

*Example III*

The procedure of Example I was repeated, except that the "Geon 151" was replaced by "Poly-Em" non-ionic polyethylene emulsion. The results were comparable.

To show the effect of varying the components and amounts thereof, several comparative runs were made (Examples IV through IX), and the results of these runs are tabulated below, along with the results of Examples I, II, and III.

protected hand iron to effect the seals. The anti-fog coated side of the film was in contact with the meat. The package was clear, transparent, strong, and without fog when placed under refrigeration at about 28° to 40° F. and remained free from fog during storage in such

TABLE

| Example | Anti-cling solutions | | | | | | | |
|---|---|---|---|---|---|---|---|---|
| | Alkali-soluble resin | Amt., percent [2] | Inert diluent | Amt., percent [1] | Polymer particle | Amt., percent [1] | Alkali | Amt. H₂O, percent |
| I | Shellac | 10.0 | "Syton 200" | 10.0 | "Geon 151" | 0.5 | NH₃ | 89.5 |
| II | Manila Loba C | 5.0 | ....do | 5.0 | ....do | 0.5 | NH₃ | 89.5 |
| III | Shellac | 10.0 | ....do | 10.0 | "Poly-Em" non-ionic polyethylene latex | 0.5 | NH₃ | 89.5 |
| IV | ....do | 10.0 | ....do | 10.0 | "Geon 151" | 3.0 | NH₃ | 87.0 |
| V | ....do | 5.0 | ....do | 5.0 | 0 | 0 | NH₃ | 90.0 |
| VI | ....do | 10.0 | ....do | 10.0 | "Dylex K-900" [2] | 0.5 | NH₃ | 89.5 |
| VII | ....do | 10 | ....do | 4.5 | Japan Wax | 1.0 | NH₃ | 84.5 |
| VIII | ....do | 14.0 | 0 | 0 | 0 | 0 | NH₃ | 86.0 |
| IX | ....do | 2.0 | Sodium silicate | 2.0 | 0 | 0 | 0 | 0 |

[1] Percent solids.  [2] "Dylex K-900" styrene-butadiene copolymer.
0—none.  sl.—slight.  v. sl.—very slight.  G—Good.  F—Fair.  P—Poor.  NC—No change.  B—Block.

| Example | Physical properties of product | | | | | | |
|---|---|---|---|---|---|---|---|
| | Gloss | Haze | Oxygen permeability | Heat seal (sliding) | Wet seal retention | Slip | Block |
| I | G | G | NC | G | G | G | 0. |
| II | G | G | NC | G | G | F | v. sl. |
| III | G | G | G | G | FG | G | 0. |
| IV | G | FG | NC | G | P | G | 0. |
| V | G | G | NC | G | G | P | v. sl. |
| VI | G | G | NC | G | P | | |
| VII | FG | FP | FG | G | G | | sl. |
| VIII | G | G | P | G | | G | B. |
| IX | G | F | NC | G | P | G | v. sl. |

From the above table it may be seen that an increase in particulate matter (Example IV) will decrease seal retention when moist, whereas the elimination of fusible particulate matter (Example V) produces a product with insufficient slip. The substitution of a less fusible type of latex ("Dylex K-900," styrenebutadiene, Example VI) decreases seal retention when moist. The use of japan wax instead of colloidal silica (Example VII) decreases gloss, increases haze, and lowers permeability to gases. The use of the resin binder alone (Example VIII) results in a product with impaired gas permeability and a tendency to block. Substituting sodium silicate for colloidal silica (Example IX) eliminates the need for additional alkali and results in the product that does not block and that has acceptable slip; however, haze is increased and the coating does not remain sealed in the presence of moisture.

*Example X*

One part of the methyl hydroxypropyl ether of cellulose, having a methoxy content of 28–30 percent, a hydroxypropoxyl content of 7–12 percent, and a viscosity of 4,000 centipoises, was slurried in six parts of a 20 percent by weight aqueous solution of sodium silicate and then diluted with water to 0.5 percent by weight of the cellulose ether.

The resulting water-soluble anti-fog coating composition was applied by a gravure coating method to the side of the coated polyethylene film prepared in Example I opposite to the side coated with the anti-cling coating composition; the coating was then dried by radiant heat to yield a coating of about 0.0001 gram per square inch of dried solids.

*Example XI*

The anti-cling, anti-fog coated film produced in Example X was used to encase fresh red meat by heat sealing the meat inside the package, using a specially temperatures for up to 72 hours. When subjected to repeated cycles of cold storage followed by exposure to room temperature, no fog formed on the inner surfaces of the package. In addition, the heat seal had good resistance to wet deterioration.

While this invention has been disclosed and illustrated by the above examples, it will be understood that the invention is obviously subject to other modifications and variations without departing from its broader aspects.

What is claimed is:

1. A polyolefin film having on at least one side an anti-cling coating formed from a coposition consisting essentially of at least one alkali-soluble resin selected from the group consisting of shellac, Manila Loba gum, gum accroides, rosin-maleic acid, rosin-fumaric acid adducts, rosin-fumaric acid adducts modified with polyhydric alcohols, zein, polyvinyl acetate-crotonic acid copolymers, polyacrylic ester acid copolymers, and mixtures thereof, at least one inert finely divided filler, and at least one fusible polymer latex selected from the group consisting of unplasticized polyvinyl chloride latex; emulsions of unoxidized polyethylene; polystyrene, polyacrylate, and methacrylate latexes; styrene-butadiene copolymers; and mixtures thereof, said inert filler being present in an amount between 20 and 150 parts per hundred parts of said resin and said fusible polymer latex being present in an amount between about 1 and 60 parts per hundred parts of said resin.

2. A coated film as described in claim 1 wherein the polyolefin film is polyethylene.

3. A coated film as described in claim 1 wherein the polyolefin film is polypropylene.

4. A transparent polyolefin wrapping film having coated on at least one surface thereof an anti-cling coating formed from a composition consisting essentially of an aqueous base solution of an alkali-soluble resin selected from the group consisting essentially of shellac, Manila Loba gum, gum accroides, rosin-maleic acid, rosin-fumaric acid adducts, rosin-fumaric acid adducts modified with polyhydric alcohols, zein, polyvinyl acetate-crotonic acid copolymers, polyacrylic ester acid copolymers, and mixtures thereof, at least one inert finely divided filler, and at least one fusible polymer latex selected from the group consisting of unplasticized polyvinyl chloride latex; emulsions of unoxidized polyethylene; polystyrene, polyacrylate, and methacrylate latexes; styrene-butadiene copolymers; and mixtures thereof, said inert filler being present in an amount between 20 and 150 parts per hundred parts of said resin and said fusible polymer latex being present in an amount between about 1 and 60 parts per hundred parts of said resin.

5. A wrapping film as described in claim 4 wherein said polyolefin is polyethylene.

6. A wrapping film as described in claim 4 wherein said polyolefin is polypropylene.

7. An article of manufacture comprising a polyolefin film having on one face thereof an antifogging coating comprising a wetting agent, a water-soluble film-forming agent, and a water-soluble inorganic salt, and on the other side thereof an anti-cling coating formed from a composition consisting essentially of an alkali-soluble resin selected from the group consisting essentially of shellac, Manila Loba gum, gum accroides, rosin-maleic acid, rosin-fumaric acid adducts, rosin-fumaric acid adducts modified with polyhydric alcohols, zein, polyvinyl acetate-crotonic acid copolymers, polyacrylic ester acid copolymers, and mixtures thereof, at least one inert finely divided filler, and at least one fusible polymer latex selected from the group consisting of unplasticized polyvinyl chloride latex; emulsions of unoxidized polyethylene; polystyrene, polyacrylate, and methacrylate latexes; styrene-butadiene copolymers; and mixtures thereof, said inert filler being present in an amount between 20 and 150 parts per hundred parts of said resin and said fusible polymer latex being present in an amount between about 1 and 60 parts per hundred parts of said resin.

8. A method of treating polyolefin film for preventing clinging thereof which comprises coating at least one surface of the polyolefin film with a coating composition formed from a composition consisting essentially of an aqueous base solution of an alkali-soluble resin selected from the group consisting of shellac, Manila Loba gum, gum accroides, rosin-maleic acid, rosin fumaric acid adducts, rosin-fumaric acid adducts modified with polyhydric alcohols, zein, polyvinyl acetate-crotonic acid copolymers, polyacrylic ester acid copolymers, and mixtures thereof, at least one inert finely divided filler, and at least one fusible polymer latex selected from the group consisting of unplasticized polyvinyl chloride latex; emulsions of unoxidized polyethylene; polystyrene, polyacrylate, and methacrylate latexes; styrene-butadiene copolymers; and mixtures thereof, said inert filler being present in an amount between 20 and 150 parts per hundred parts of said resin and said fusible polymer latex being present in an amount between about 1 and 60 parts per hundred parts of said resin.

9. A method according to claim 8 in which the polyolefin is polyethylene.

10. A method according to claim 8 in which the polyolefin is polypropylene.

References Cited by the Examiner

UNITED STATES PATENTS

| | | | |
|---|---|---|---|
| 2,021,947 | 11/1935 | Schopp | 117—168 XR |
| 2,597,872 | 5/1952 | Iler | 260—27 |
| 2,697,664 | 12/1954 | Goeser et al. | 99—174 |
| 2,772,247 | 11/1956 | Schroeder | 260—27 |
| 2,931,732 | 4/1960 | Hoffman et al. | 99—174 |
| 2,991,262 | 7/1961 | Johnston | 620—27 |
| 3,090,755 | 5/1963 | Erchak et al. | 117—100 XR |

WILLIAM D. MARTIN, *Primary Examiner.*

HYMAN LORD, *Examiner.*